UNITED STATES PATENT OFFICE.

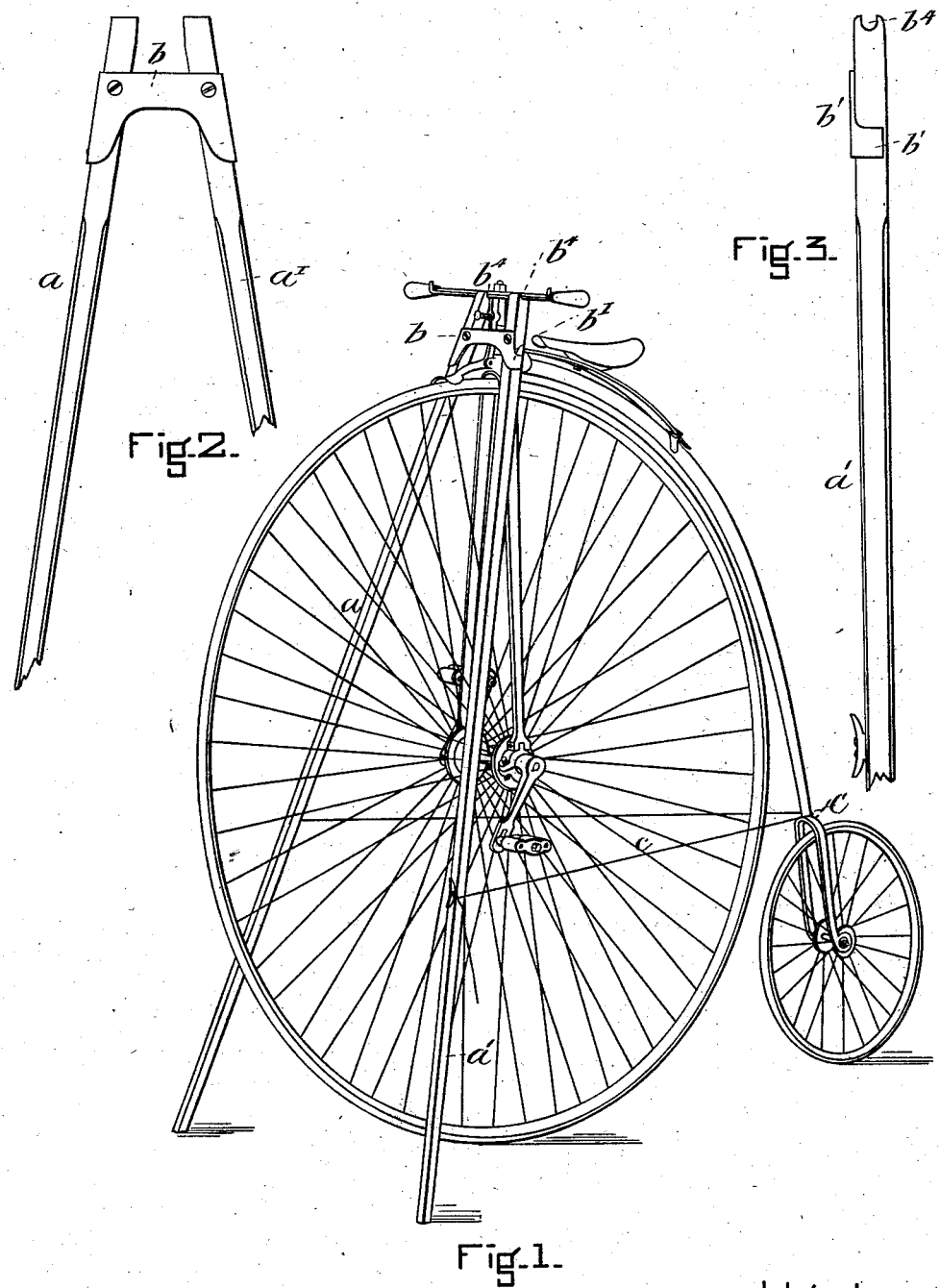

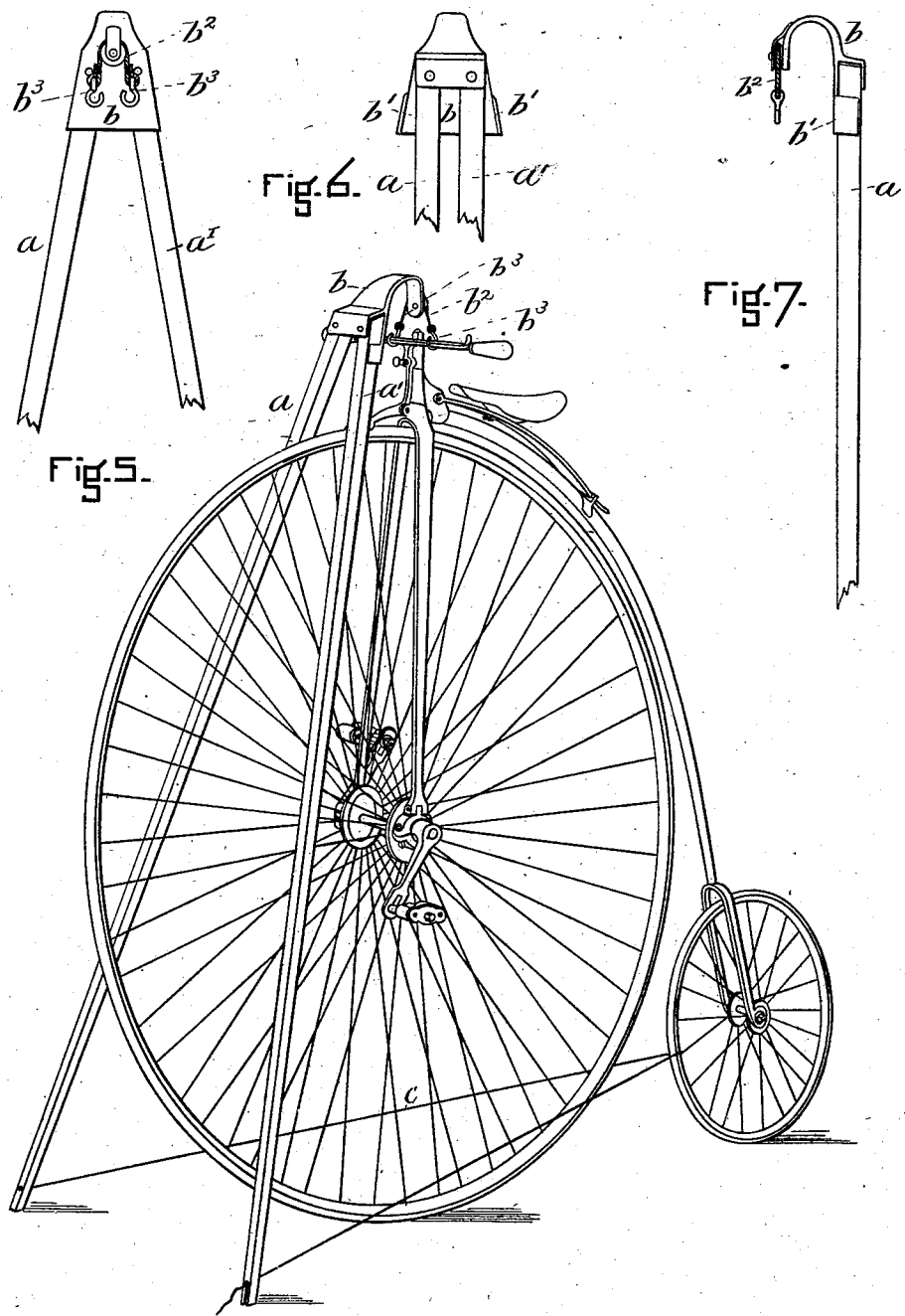

SYLVESTER SAWYER, OF GARDNER, MASSACHUSETTS.

BICYCLE-SUSPENDER.

SPECIFICATION forming part of Letters Patent No. 260,053, dated June 27, 1882.

Application filed October 31, 1881. (No model.)

*To all whom it may concern:*

Be it known that I, SYLVESTER SAWYER, of Gardner, in the county of Worcester and State of Massachusetts, have made certain new and useful Improvements in Bicycle-Suspenders, of which the following is a full, clear, and exact description, reference being had to the accompanying drawings, forming a part of this specification in explaining its nature, in which—

Figure 1 is a perspective of my invention, illustrating its application. Fig. 2 is a front elevation of a portion thereof. Fig. 3 is a side elevation. Fig. 4 is a perspective of a modified form of my suspender with bicycle in place. Figs. 5, 6, and 7 are detail views, further representing its construction.

This invention has for its object the suspension or supporting of a bicycle in an upright position. It is very desirable, for two purposes at least, to support a bicycle in such a position: First, because it takes up less room when held or supported in that way; and, second, because the bicycle can be used for pedal practice during the winter months or at any other time, the support being so arranged that the large wheel is lifted from the ground or floor in a manner not to interfere with the operation of the treadles.

It consists of the two uprights or posts $a$ $a'$, hinged to each other at their top, either directly or by means of a metallic connecting portion, $b$. I prefer the last-named construction.

The metallic connection is provided, it will be observed, with two stops, $b'$, which prevent the posts or standards from being spread apart beyond a desirable distance, and it may have hooks which are adapted to support the arms of the bicycle-handle; or it may have depending from it a short rope, $b^2$, as shown in Fig. 4, to the ends of which are attached the hooks $b^3$, which are also adapted to lay hold of the bicycle-handle rod. In some instances, instead of the hooks, grooves $b^4$ may be cut in the upper ends of the standard, as represented in Figs. 1 and 3, in which case the bicycle will be supported, as shown in Fig. 1.

Of course the intermediate connecting part $b$ may not be of metal, and various equivalents for attaching a bicycle to this intermediate part or to the upper end of the jointed supports are obvious.

The suspender has, in addition to devices for holding the bicycle, as thus described, a rope or cord, $c'$, which is attached to one post or standard at or near the bottom, as represented, and when in use is passed about the backbone of the bicycle just above the small wheel or between the spokes of the small wheel, as may be desired, and back to the other post, to which it is secured in any desirable way.

Of course the rope may be passed about the backbone and the tire of the small wheel at the point $c'$, if desired, instead of about the backbone only.

The entire device, in connection with the bicycle, when in use forms a tripod, substantially, of which the two posts and the backbone and small wheel are the legs, the large wheel being suspended at any distance from the floor or ground, according to the inclination of the front posts or standards.

Of course any other desirable equivalent means for uniting and staying the lower end of the backbone or the small wheel to the front legs or posts of the suspender may be used in lieu of the cord or rope described without departing from the spirit of this invention.

This improvement is very desirable in the storing of bicycles, because they can be held in a vertical position and be placed closely together. It is also of value, because when not in use it can be packed away in small compass.

Having thus fully described my invention, I claim and desire to secure by Letters Patent of the United States—

As an improved article of manufacture, a bicycle-suspender consisting of the legs or supports $a$ $a'$, united together at or near their upper ends, and having means for supporting the bicycle, substantially as specified, with a stay, rope, or brace, $c$, all substantially as and for the purposes set forth.

SYLVESTER SAWYER.

Witnesses:
T. B. DUNN,
A. P. JOHNSON.